United States Patent [19]

Sakakibara et al.

[11] 4,234,617
[45] Nov. 18, 1980

[54] METHOD FOR PREPARING INSTANT COOKING NOODLES

[75] Inventors: Sakuichi Sakakibara, Kobe; Ko Sugisawa; Takashi Kimura, both of Nara; Teruo Yasukawa, Sakai; Tamotsu Kamoda, Kishiwada, all of Japan

[73] Assignee: House Food Industrial Company, Limited, Osaka, Japan

[21] Appl. No.: 29,634

[22] Filed: Apr. 13, 1979

[30] Foreign Application Priority Data

May 23, 1977 [JP] Japan .................................. 52 58719

[51] Int. Cl.$^3$ ............................................... A23L 1/16
[52] U.S. Cl. ..................................... 426/557; 426/451; 426/458; 426/622; 426/661
[58] Field of Search ................ 426/557, 618, 622, 653, 426/661, 451, 458, 496, 502, 503, 504, 506, 511

[56] References Cited

U.S. PATENT DOCUMENTS

| | | | |
|---|---|---|---|
| 2,677,613 | 5/1954 | Shiah | 426/557 X |
| 3,846,563 | 11/1974 | Cunningham | 426/557 X |
| 3,966,990 | 6/1976 | Cremer et al. | 426/496 X |
| 4,098,906 | 7/1978 | Hisaki et al. | 426/557 X |

FOREIGN PATENT DOCUMENTS 50-39129 12/1975 Japan ....................................... 426/557

*Primary Examiner*—Arthur L. Corbin

[57] ABSTRACT

Instant cooking noodles are prepared from a dough comprising a cereal flour and a hydrolyzate of a starch derived from a root or stalk of a plant having a D.E. of 1 to 10. The dough is rolled into a sheet having a thickness of less than 2 mm, the sheet is cut into strips, the strips are steamed, and the steamed strips are dried.

9 Claims, No Drawings

METHOD FOR PREPARING INSTANT COOKING NOODLES

The present invention relates to improvements in a method for preparing instant cooking noodles.

Dehydrated instant cooking noodles, which can be reconstituted by boiling in hot water in a short period of time, and snack noodles, packaged in a container with dehydrated additives, which may be restored rapidly simply by adding hot water, are known. Most of these conventional noodles are prepared by frying the raw noodles in hot oil. While they are a convenience food, the reconstituted noodles do not have the palatability of regular cooked noodles and, in addition, extended storage of such dehydrated noodles may cause the oil to become rancid.

To overcome these disadvantages, it has been proposed to dry the noodles with hot air at comparatively low temperatures and for a long period of time. Noodles thus obtained take a long time to be reconstituted, due to the shrinkage of the pieces during drying, and the consistency and palatability of the reconstituted noodles are not desirable since the surface of the individual dried noodles is not as porous as that of fried noodles.

It is a primary object of this invention to overcome the various disadvantages of conventional dehydrated instant cooking noodles and to prepare such noodles which are easily reconstituted in hot water, which have improved palatability and which have the mouth feel of cooked raw noodles.

When raw noodles are dried with hot air, the evaporation velocity of water from the surface of the individual noodles is generally constant at the first stage of drying since the surface of the noodles is covered with a membrane of water and the water is evaporated just like from a free surface of water. The evaporation velocity of water is affected by the diffusion velocity of water from the inner portion to the surface of the pieces of dough wherefore the evaporation velocity is retarded at the second stage of drying since the water on the surface is diminished during evaporation. It takes a considerable period of time to dry the raw noodles during which time they are exposed to severe conditions, and the resultant shrinkage of the noodle body causes insufficiency of reconstitution.

Various known instant cooking noodles have been prepared from a dough containing wheat flour and starch. We studied the evaporation of water in drying the dough containing starches and prepared the instant cooking noodles from doughs containing many kinds of starches, such as starch hydrolyzate, oxidized starch, alpha-starch, waxy corn starch, and high amylose corn starch.

We have now found that noodle dough containing a hydrolyzate of a starch derived from a root or stalk of a plant, rather than seeds, has a superior ability of absorbing water rapidly, i.e. an affinity to water, and the drying time of pieces of noodle dough containing wheat flour, for example, and such a starch hydrolyzate was reduced considerably. In addition, we have found that the shrinkage and hardening of the surface of the dried noodles were reduced and the permeation of water into the inner portion of the reconstituted noodles was accelerated. The water diffuses rapidly from the inner portion of the noodle dough pieces to the surface and the evaporation from the surface is accelerated because of the excellent affinity of the starch hydrolyzate to water.

Accordingly, we mix cereal flour with a hydrolyzate of a starch derived from a root or stalk of a plant having a D.E. of 1 to 10, water and optional dough ingredients to produce a dough mixture. The mixture is kneaded to form a dough, the dough is rolled into a sheet having a thickness of less than 2 millimeters, the rolled sheet is cut into strips, the cut strips are steamed and the steamed strips are dried.

Noodles reconstituted from such dried raw noodles have an excellent palatability.

When the D.E. (dextrose equivalence) value of the starch hydrolyzate is less than 1, little or no acceleration of the diffusion velocity of water from the inner portion to the surface of the raw noodles during drying and of reconstitution velocity of the dehydrated noodles in hot water can be observed. When the D.E. is more than 10, the dehydrated noodles absorb too much water during reconstitution and the palatability and elasticity of the reconstituted noodles is considerably reduced. The preferred D.E. of the starch hydrolyzate is 2 to 8.

The hydrolyzate of a starch derived from a root or stalk of a plant may be used as the sole starch or together with other hydrolyzates but the amount of the hydrolyzate of a starch derived from a root or stalk of a plant should be between 1% and 10%, by weight, of the cereal flour used in the dough mixture. If less than 1%, by weight, of the starch hydrolyzate is used, no substantial acceleration of the evaporation rate during drying and reconstitution velocity are obtained. When the amount of the starch hydrolyzate exceeds 10%, by weight, the surface of the reconstituted noodles becomes too soft to maintain a favorable elasticity and desirable palatability.

The cereal flour used in the dough mixture as the main ingredient thereof is preferably selected from wheat flour and buck wheat flour although other cereal flours may be used.

The starch derived from a root or stalk of a plant is usually stored underground in the root or stalk of the plant and is isolated from the root, stalk, rhizome, rootstock, bulb or tuber of the plant, but not from its seed, and includes such starches as cassava (tapioca) starch, arrow-root starch, and potato starch, the preferred starches including potato, sweet potato and tapioca starch.

The hydrolyzate of these starches is prepared conventionally by the hydrolysis of the starch with an acid, such as hydrochloric, sulfuric and acetic acid, or with enzymes, such as alpha-amylase, isoamylase, and the like.

If desired, such natural starches as potato, sweet potato, corn, wheat, rice and tapioca starch may also be incorporated into the dough mixture to improve the palatability and the mouth feel of the reconstituted noodles. Natural starches derived from a root or stalk of a plant are preferred for this purpose. These natural starches are most economically added in an amount of 4% to 24%, by weight, of the cereal flour in the dough mixture, the total amount of the natural starches and the hydrolyzate of starch derived from a root or stalk of a plant being between 5% and 25%, by weight, of the cereal flour.

The thickness of the rolled dough should be less than 2 millimeters, preferably less than 1.5 mm and most preferably between 0.8 to 1.2 mm. If the thickness exceeds about 2 mm, steaming and drying of the strips of dough are not carried out evenly and efficiently, and it takes a long time for the dehydrated noodles to be reconstituted adequately and evenly.

While various drying methods may be used, drying with hot air is preferred, the temperature of the drying air being preferably between 80° C. and 130° C. When the temperature is below 80° C., the drying efficiency is reduced and the noodles shrink too much, and if the temperature exceeds about 130° C., the noodles are overdone and scorched. The moisture content of the dehydrated noodles is preferably below 14% to increase the storage life.

The main advantage of the method of the invention is the reduction of the drying time by several minutes or even several tens of minutes. Furthermore, shrinkage or hardening of the surface of the dehydrated noodles is at least largely avoided, and the dehydrated product can be rapidly reconstituted with hot water to form a palatable reconstituted noodle product having a similar mouth feel as cooked raw noodles.

The following comparative tests were carried out with dough mixtures indicated in Table 1, all parts being by weight:

TABLE 1

| Sample | Wheat flour | Potato starch | Acid hydrolyzate of potato starch, D.E. 3 |
|---|---|---|---|
| A | 100 | — | — |
| B | 100 | 5.3 | — |
| C | 100 | — | 5.3 |
| D | 100 | 19 | 6 |

As optional dough ingredients, 1.5% w/w salt and 32% w/w Kansui were added to the mixture with water in a sufficient amount to make the mixture kneadable. The dough mixture was kneaded to form a dough and rolled to a thickness of 0.95 mm. The rolled sheet of dough was cut into strips with cutting rollers, the strips of dough were steamed on a conveyor, cut into 80 grams of noodle lumps and dried with hot air having a temperature of 60°–140° C. to obtain dehydrated noodles having 8% moisture. The dehydrated noodle lump was packed in a container which is filled with boiling water. The noodles were fully immersed in the boiling water and left standing therein for four minutes. The lump of noodles was then transferred to a perforated basket, the water was drained off by shaking the basket and the weight of the reconstituted noodles was measured.

Table 2 shows the ratio of the weight of the noodles after and before reconstitution, as well as the palatability or mouth feel of the reconstituted noodles:

TABLE 2

| Sample | Temperature of drying air | | | | |
|---|---|---|---|---|---|
| | 60° | 80° | 100° | 130° | 140° |
| A weight ratio | — | 2.22 | 2.28 | 2.30 | — |
| palatability | — | x | x | x | — |
| B weight ratio | — | 2.34 | 2.35 | 2.36 | — |
| palatability | — | Δ | Δ | Δ | — |
| C weight ratio | 2.27 | 2.40 | 2.46 | 2.50 | 2.55 |
| palatability | x | o | o | o | ▽ |
| D weight ratio | 2.36 | 2.42 | 2.51 | 2.59 | 2.63 |
| palatability | Δ | o | o | o | ▽ | x indicates that the core of the reconstituted noodles remained hard
Δ indicates that the core of the reconstituted noodles had some degree of hardness left
▽ indicates that the surface of the noodles is too soft and rather sticky
o indicates even and adequate reconstitution of the noodles in the core and on the surface Samples C and D are prepared according to the method of the present invention.

As Table 2 shows, Samples C and D dried with hot air having a temperature between 80° C. and 130° C. have superior properties as compared to the other samples and different heating temperatures.

Similar results were obtained in like tests with strips of a thickness anywhere below 2 mm, particularly between 0.8 and 1.5 mm.

The following examples illustrate the method of this invention without in any way limiting thereto.

EXAMPLE 1

Ten kilograms of wheat flour was mixed with 500 grams of acid hydrolyzate of potato starch having a D.E. value of 2, 20 grams of Kansui, 200 grams of salt, and this mixture was incorporated into 30%, by weight, of water. The mixture was kneaded to form a dough and the dough was rolled into a sheet of 0.85 mm thickness, and cut into strips with cutting rollers.

The strips were steamed on a conveyor, cut into 90 grams of noodle lumps and dried with hot air at 90° C. for 28 minutes to obtain dehydrated noodles having a moisture content of 7%. After cooling, the dehydrated lumps of noodles were packed into a thermally insulated container, and other dehydrated ingredients and soup were added to produce snack noodles. The container with the snack noodles was filled with hot water and left standing for three minutes to obtain adequately reconstituted noodles having an elasticity and palatability similar to that of cooked raw noodles.

EXAMPLE 2

Eight kilograms of wheat flour was mixed with 100 g of hydrolyzate of potato starch hydrolyzed with an enzyme to produce a hydrolyzate having a D.E. value of 5. One and a half kilograms of natural potato starch and 200 g of salt were added to 31% water, and the mixture was kneaded into a dough which was rolled to a thickness of 1.2 mm and cut into strips.

The strips were steamed on a conveyor, cut into 90 g lumps of noodles, and dried with hot air at a temperature of 120° C. for 15 minutes to obtain dehydrated noodles having about 7% moisture.

The dried noodles were packed into a container, and the container was filled with hot water and left standing for five minutes. The noodles were adequately reconstituted and they were sufficiently elastic and very palatable.

EXAMPLE 3

Six and a half kilograms of wheat flour was mixed with 3 kg of buck wheat flour, 700 g of hydrolyzate of tapioca starch having a D.E. value of 2 and 200 g salt. The mixture was added to 32% water and kneaded, the resultant dough was rolled to a thickness of 0.95 mm and cut into strips.

The strips were steamed on a conveyor, cut into 90 g lumps of noodles and dried with hot air at 120° C. for 12 minutes to obtain dehydrated noodles having 10% moisture.

The dehydrated noodles were packed in a container, the container was filled with hot water and left standing for four minutes. The noodles were adequately and evenly reconstituted, with an attractive mouth feel and elasticity.

What we claim is:

1. A method for preparing instant cooking noodles, comprising the steps of
    (a) mixing a cereal flour with about 1% to 10%, by weight, based on the weight of the cereal flour, of a hydrolyzate of a starch derived from a root or stalk of a plant having a D.E. of 1 to 10 and water to produce a dough mixture,
    (b) kneading the mixture to form a dough,
    (c) rolling the dough into a sheet having a thickness of less that 2 millimeters.
    (d) cutting the rolled sheet into strips,
    (e) steaming the cut strips, and
    (f) drying the steamed strips at a temperature of about 80° C. to 130° C.

2. The method of claim 1, wherein the cereal flour is selected from the group consisting of wheat flour and buck wheat flour.

3. The method of claim 1, wherein the starch is selected from the group consisting of potato starch, sweet potato starch and tapioca starch.

4. The method of claim 1, wherein the dough is rolled into a sheet having a thickness of 0.8 to 1.2 millimeter.

5. The method of claim 1, wherein the steamed strips are dried with hot air.

6. The method of claim 1, wherein the mixture further contains a natural starch.

7. The method of claim 6, wherein the amount of the natural starch is 4% to 24%, by weight, of the amount of the cereal flour, and the total amount of the natural starch and the hydrolyzate of the starch derived from a root or stalk of a plant is between 5% and 25%, by weight, of the cereal flour.

8. The method of claim 6, wherein the natural starch is derived from a root or stalk of a plant.

9. The method of claim 1, wherein a dough ingredient is mixed with the cereal flour, starch hydrolyzate and water.

* * * * *